United States Patent [19]

Bernstein et al.

[11] Patent Number: 4,785,474
[45] Date of Patent: Nov. 15, 1988

[54] EMERGENCY SIGNAL WARNING SYSTEM

[75] Inventors: Bernard Bernstein, Phoenix; Guy L. Sohie, Chandler, both of Ariz.

[73] Assignee: Sy/Lert Systems Limited Partnership, Phoenix, Ariz.

[21] Appl. No.: 80,545

[22] Filed: Jul. 31, 1987

Related U.S. Application Data

[63] Continuation-in-part of Ser. No. 030,220, Mar. 25, 1987.

[51] Int. Cl.$^4$ .............................................. H04R 29/00
[52] U.S. Cl. ................................. 381/56; 340/902; 324/77 E; 324/78 D; 324/78 F
[58] Field of Search ................. 340/901, 902; 381/56, 381/58, 98; 324/77 E, 78 D, 78 F

[56] References Cited

U.S. PATENT DOCUMENTS

| | | | |
|---|---|---|---|
| 2,545,218 | 3/1951 | Weber | 177/352 |
| 3,014,199 | 12/1961 | Dill | 340/34 |
| 3,158,835 | 11/1964 | Hipkins | 340/34 |
| 3,233,217 | 2/1966 | Bost | 340/33 |
| 3,293,600 | 12/1966 | Gifft | 340/33 |
| 3,371,278 | 2/1968 | Gelushia | 325/64 |
| 3,412,378 | 11/1968 | Thomas | 340/34 |
| 3,453,540 | 7/1969 | Dusheck, Jr. | 324/77 E |
| 3,532,986 | 10/1970 | Gelushia | 325/21 |
| 3,735,342 | 5/1973 | Helliker | 340/34 |
| 3,859,623 | 1/1975 | Koehler | 340/34 |
| 3,873,963 | 3/1975 | Neal | 340/34 |
| 4,158,190 | 6/1979 | Stefanov | 340/34 |
| 4,209,769 | 6/1980 | Chronerberry | 340/34 |
| 4,303,979 | 12/1981 | Kato et al. | 324/78 D |
| 4,380,004 | 4/1983 | Coats | 340/34 |
| 4,542,525 | 9/1985 | Hopf | 381/56 |
| 4,625,206 | 11/1986 | Jensen | 340/902 |
| 4,640,134 | 2/1987 | Simmons | 324/78 F |

FOREIGN PATENT DOCUMENTS

0179348  9/1985  Japan ................................. 340/902

Primary Examiner—Isen Forester W.
Attorney, Agent, or Firm—LaValle D. Ptak

[57] ABSTRACT

A siren detection system is particularly suited for installation in an automobile for providing a warning to the driver when an emergency vehicle is in the vicinity of the automobile. The system includes a microphone mounted on the automobile. The output of the microphone is supplied to a bank of band-pass filters, each tuned to a different adjacent portion of the frequency range through which the frequency of a siren varies. The output of the filters are sampled by an averaging and selection circuit which produces a single output corresponding to the central one of any of the filters producing an output during a preestablished time interval. This output then is compared with the previous output (which indicates the previously selected band-pass frequency) to operate an up/down counter. Whenever successive counts of a preestablished number in the same direction occur, the output of the counter enables an alarm to indicate the presence of a siren operated by an emergency vehicle in the vicinity of the automobile. The system also includes circuits for enhancing noise rejection in the same frequency range.

9 Claims, 5 Drawing Sheets

EMERGENCY SIGNAL WARNING SYSTEM

RELATED APPLICATION

This application is a continuation-in-part of application Ser. No. 07/030,220, filed Mar. 25, 1987.

BACKGROUND

Systems for detecting the sirens of emergency vehicles to provide a warning signal to the driver of an autormobile have been known for many years. In the simplest form, such systems employ a band-pass filter or comparable device to respond to signals only within the frequency range of emergency vehicle sirens. Whenever such a signal is received in such a system, an alarm or warning device in the form of a light or sound is operated within the automobile. Such simple systems, however, have not been satisfactory since they are easily triggered by "noise" signals having nothing to do with emergency vehicle sirens. After a number of "false alarms", a driver of an automobile equipped with such a system has a tendency to ignore the alarm when it sounds, thereby defeating the purpose of the system.

Modern automobiles are extremely well sound-proofed. Most such automobiles are operated with the windows closed practically all of the time. In the winter, the heater system of the automobile is used to keep the interior warm and in the summer an air conditioning system is used to cool the interior of the vehicle. In addition, most modern automobiles have radios, or extensive sound entertainment systems in them; and if the radio is being played with the windows closed and with either the heater system or the air conditioner operating (with its accompanying fan) it is difficult, if not impossible, for the occupants of the automobile to hear the siren of an approaching emergency vehicle until such an emergency vehicle is extremely close to the automobile. In fact, in many cases, the driver and other occupants of an automobile do not heat the siren of an approaching emergency vehicle until the emergency vehicle is only a few feet away. As a result, a high potential for an accident between the automobile and the emergency vehicle exists.

To overcome some of the disadvantages of the false alarms which are possible with simple band-pass detections systems, tone detector systems employing a plurality of narrow band tone responsive channels have been developed. Such systems then operate only when tones in all of the channels are present, or when the tones occur in a preestablished successive order.

Four patents which are directed to a type of pattern recognition for an emergency vehicle siren are the patents U.S. Pat. Nos. 3,735,342 to Helliker; 3,859,623 to Koehler; 4,158,190 to Stefanov; and 4,625,206 to Jensen. All of these patents are directed to systems which recognize specific frequencies within the "siren" band of signals typically produced by emergency vehicles. In addition, all of these systems attempt to minimize false triggering of the alarm circuit by noise signals.

The system disclosed in the Helliker patent provides pattern recognition by cascading the detected outputs of tuned filters with one another, so that an output signal is obtained only when the tuned filters all produce an output within a preestablished time interval. The system continuously is reset (thus establishing the preestablished time interval); so that even if noise signals should activate one or more of the tuned filter circuits, no output is obtained. It is necessary for all of the signals to occur in the proper sequence or no output is obtained. if, as a result of interference, an improperly operating siren, or an aberration in the siren frequency (such as caused by the sound bouncing off of buildings or the like), the system of Helliker may be reset without activating the alarm, even in the presence of a siren signal which it is desired to detect.

The Jensen patent is not directed to an alarm for use within an automobile, but is concerned with the actuation of a traffic signal light control to cause the signal light to be operated to cause red lights in one direction and green lights in another, as determined by the direction of the source of the siren sound pattern detected. The Jensen patent, however, is of interest for its disclosure of systems which operate to sequentially detect frequencies found in the typical range of emergency vehicle sirens. The audio tones must be detected in the proper sequence and frequency. Detection of one frequency enables the circuit to detect signals of the next higher (or lower) frequency and so on. Out-of-sequence tones disable the circuit and reset it.

The system disclosed in the Koehler patent is designed to detect a pair of spaced frequencies which are within the siren frequency range. Koehler relies upon a "wailing" siren signal which has a repetition frequency at a relatively low rate. The detected signals produce an output at the repetition frequency which then is used to trigger the alarm. Noise signals occurring at repetition rates other than the repetition frequency, even if they do include signals of the same frequencies as the two siren signal frequencies, will not have the required repetition rate and will not permit triggering of the alarm system. In an extremely noisy, heavy traffic environment, such as typically is found in large cities, it may be possible to false trigger this system.

In addition, the system of Koehler assumes a relatively uniform repetition frequency of the siren. Modern emergency vehicles, however, do not always operate the siren in the same mode. When such a vehicle approaches a traffic intersection, the driver generally switches the siren from a "wailing" operating mode to what is known as a "yelp" operating mode. The repetition frequency of a siren operating in the "yelp" mode is higher than the frequency of a "wailing" mode. As a consequence, if the Koehler system is adjusted to detect a "wailing" siren, it may not detect a "yelp" siren and vice-versa.

Another approach for tracking a "wailing" siren frequency is disclosed in the Stefanov patent. In Stefanov, however, the "wailing" frequency rate is tracked by a voltage tunable filter. If a siren is present, this "wailing" signal occurs at a fixed rate, which is generally uniform for most emergency vehicle sirens. The outputs for the voltage tunable filter controlled by the "wailing" signal then are passed through low and high frequency filters to control the operation of the alarm circuit. The voltage tunable filter provides an output corresponding to the dominate frequency; and this output is converted to a voltage by means of a frequency-to-voltage converter which then is fed back to the band-pass filter to shift the center frequency of that filter, thereby to track the dominate frequency signal. When this signal results from a "wailing" siren, the fed-back voltage from the converter constitutes a slowly and continuously varying AC signal corresponding to the pitch variation of the siren. This signal is detected by a low-pass filter and a differentiating circuit to operate an alarm within an automobile. When the dominate frequency results from noise or steady state sounds or varies at a rate other than the slowly varying AC signal, a different or random shifting of the center frequency of the band-pass filter occurs. Additional circuitry responsive to such random signal shifts generates an inhibiting signal to prevent spurious operation of the alarm within the automobile. To be effective, this system requires several cycles of operation in order to produce an alarm output. Under many conditions, the number of cycles required may be such that the alarm within the automobile is not triggered until the emergency vehicle is dangerously close. As with prior art patents which require a sequential or cascading detection of signals within the siren frequency range for proper operation, it is possible for Stefanov to fail to trigger an alarm even though an emergency vehicle siren is present, if that siren somehow is not fully operating properly in the expected manner or if sound reflections from nearby buildings and the like distort some aspects of the siren signal.

It is desirable to provide a siren detection alarm for use within an automobile which overcomes the disadvantages of the prior art, which is not subject to "false" alarms, and which accurately provides an alarm indication even in the presence of imperfect siren signals.

SUMMARY OF THE INVENTION

It is an object of this invention to provide an improved sound pattern detection system.

It is another object of this invention to provide an improved siren detection system.

It is an additional object of this invention to provide an improved siren detection system in automobiles.

It is a further object of this invention to provide an improved siren detection system having superior noise discrimination characteristics.

It is yet another object of this invention to provide an improved sound pattern discrimination system for use in an automobile to activate an alarm in the automobile when an emergency siren is operated in the vicinity of the automobile.

In accordance with a preferred embodiment of the invention, a system, particularly suited for installation in an automobile, operates to detect the presence of sound signals varying in frequency in a predetermined manner over a predetermined frequency range. The sound signals are supplied to a bank of band-pass filters each tuned to a different adjacent portion of the frequency range through which the sound signals vary. The outputs of the filters are then sampled by an averaging circuit which produces a single output corresponding to the central one of those filters producing an output during a preestablished sampling time interval. This output then is compared with the output of the preceding sampling time interval (which indicated the previously selected band-pass frequency) to operate an up-/down counter. Whenever a predetermined number of successive counts in the same direction occurs, the output of the counter enables an alarm to indicate the presence of the varying frequency sound signal which is to be detected.

DETAILED DESCRIPTION

Figure 1:
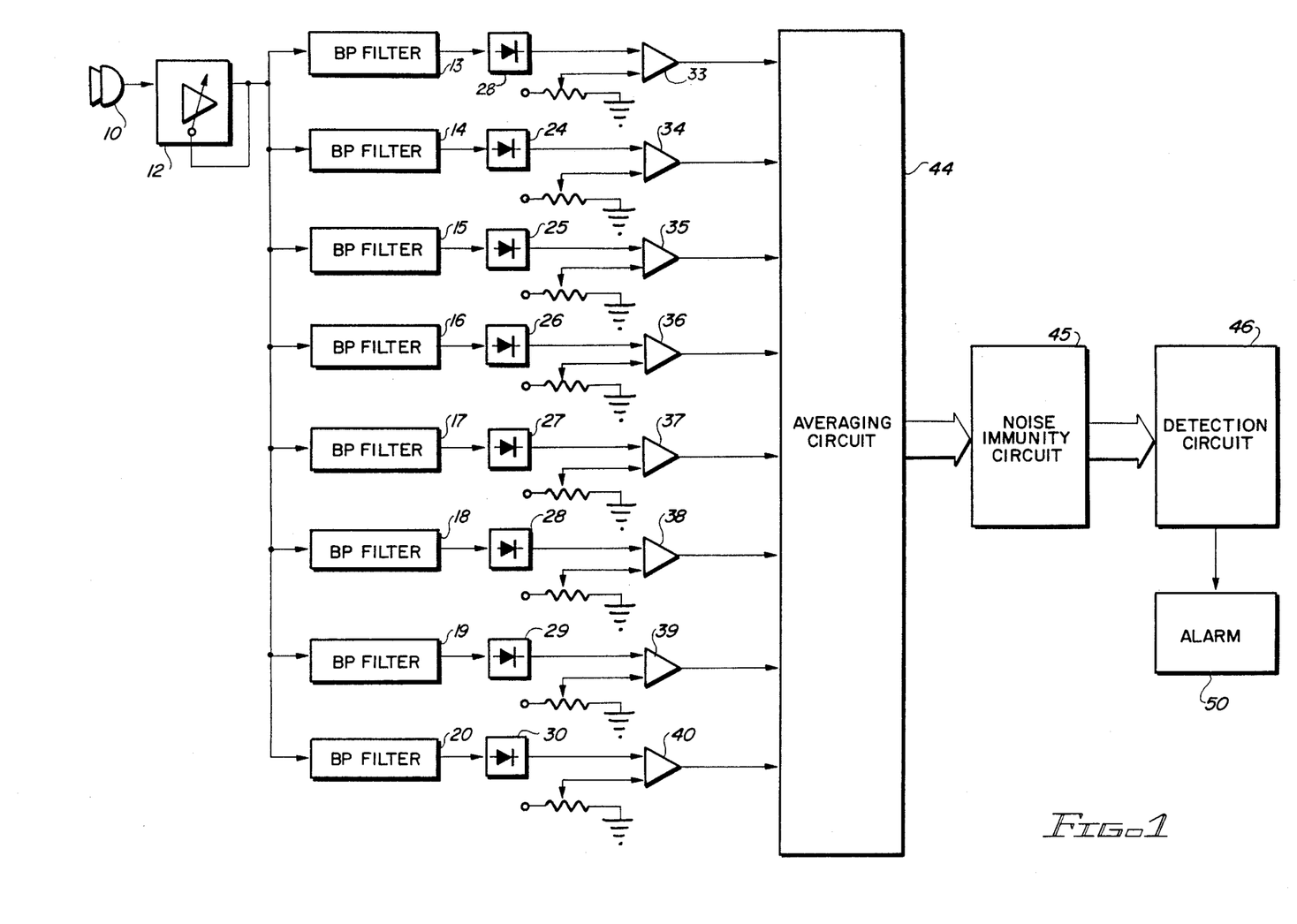
FIG. 1 is a block diagram of a preferred embodiment of the invention.

Reference now should be made to the drawings in which the same reference numbers are used throughout the different figures to designate the same components. FIG. 1 is a block diagram of the circuitry employed in a preferred embodiment of the invention. The system illustrated in FIG. 1 is to be mounted in an automobile whenever an emergency vehicle siren is sounded near the automobile to provide the driver of the automobile with sufficient advance warning of the presence of the emergency vehicle to permit the driver to take the necessary proper action.

The system includes a microphone 10 which is mounted at a position on the automobile to pick up or detect sounds outside of the interior. Typical mounting places are on the roof, behind the front grill, or some other suitable location. Audio signals impinging on the microphone 10 are converted to electrical signals which are amplified by an amplifier system 12 which has an automatic gain control feature. In addition, this portion of the circuit typically includes a band-pass filter (not shown) having a lower cut-off frequency of approximately 500 Hz and having an upper cut-off frequency of approximately 1600 HZ, so next bit and associated memory location. If the "shift count" is that signals outside this frequency band are eliminated. This improves the noise rejection characteristics of the system. Sirens used by emergency vehicles such as police cars, ambulances, and fire trucks generally produce sinusoidal signals, the pitch or frequency of which and the intensity of which varies with time. Actual sirens currently in use in the United States and in other countries of the world have a frequency range between 600 of and 1600 Hz when Doppler effects are taken into account. The sirens cover this range at a rate of approximately 15 cycles per minute (for a "wail") and 240 cycles per minute (for a "yelp"). These characteristics are universal.

Since the signals picked up by the microphone 10 vary in voltage or intensity as well as in frequency, the use of an Automatic Gain Control (AGC) loop in the amplifier 12 is highly desirable. In addition, signals which are picked up from a more distant siren have a lower intensity than signals picked up from a siren in the immediate vicinity of the microphone 10. Consequently, the AGC feature of the amplifier 12 is necessary to cause uniform operation of the system.

After processing by the amplifier 12, the electrical signals in the desired frequency range of 600 to 1600 Hz are supplied in parallel to a bank of 8 band-pass filters 13 to 20, which cover successive narrow bands over the frequency range of 600 to 1600 Hz. For example, the filter 13 passes signal frequencies in the range from 600 Hz to 725 Hz. The second filter 14 passes signal frequencies in the range from 725 Hz to 850 Hz and so on with the last filter 20 passing signals in the frequency band from 1,475 Hz to 1,600 Hz.

Consequently, as a siren sound is picked up by the microphone 10, the signal as detected should appear successively at the outputs of these 8 filters in ascending order (filters 13 through 20) as the siren sound sweeps upwardly through the frequency range, and in descending order (filters 20 through 13, respectively) as the siren sound sweeps downward in frequency through the range of 600 Hz to 1600 Hz. At the same time, noise is present in the vicinity of the microphone 10 in the frequency range from 600 to 1600 Hz. This noise, however, appears randomly at the outputs of the filters 13 through 20, since its frequency does not change or vary in the cylindrical fashion of a siren signal.

The outputs of the filters 13 through 20 are passed through corresponding detectors 23 through 30 to convert these outputs into a direct current format. Consequently, whenever a signal is present at the output of any one of the filters, the output of the corresponding detector is a positive voltage of a predetermined amount and when a signal is not present, the output of the corresponding detector 23 through 30 is zero volts or grounds, representing respectively digital "1" or "0" signals.

The magnitude of any positive voltage signals from any of the detectors 23 through 30, however, can vary depending upon the magnitude of the signal passed by the corresponding filter 13 through 20. To eliminate weak or spurious signals, a threshold for making the digital determination must be made. To accomplish this, corresponding comparators 33 through 40 are connected to the outputs of the detectors 23 through 30. One of the inputs of each of the comparators 33 through 40 is obtained from the associated one of the detectors 23 through 30, while the other input is attached to a variable threshold voltage to establish the decision level for determining the presence or absence of a desired signal from any one of the band-pass filters 13 through 20. The result is a positive voltage (a digital "1") from the output of any one of the comparators 33 through 40 when the output of the corresponding filters 13 through 20 exceeds the preestablished threshold. Whenever the output of the corresponding filter 13 through 20 is below the threshold established at the input of the corresponding comparator 33 through 40, the comparator output is zero volts (a digital "0").

The outputs of the comparators 33 through 40 then are supplied in parallel to an averaging circuit 44. The averaging circuit 44 samples each of the outputs of the comparators 33 through 40 at a time rate which is in excess of the expected variations in a siren signal to be detected by the microphone 10. The averaging circuit 44 in turn, provides outputs indicative of the presence or absence of a "1" signal from any of the filters 13 through 20, as reflected in the outputs of the comparators 33 through 40, a preestablished percentage of the samples taken over a sampling interval or unit of time.

After this operation by the averaging circuit, 8 inputs are supplied in parallel to a noise immunity circuit 45 which then selects the center one of any of the "1" signals present for the preestablished percentage of time during the sampling interval. This selection process is necessary because siren signals, particularly because of reflections, wind, speed, etc., and when they are operated in the presence of substantial noise, do not provide in a clean, one-at-a-time, sequential output from the various filters 13 through 20. Instead, a siren signal may result in one or more of the filters producing an output at any given time or a skipping of one or more frequencies as the siren signal moves up and down through the frequency range. The noise immunity circuit 45 takes this into consideration and selects the most logical signal for each sampling interval of the averaging circuit 44. The noise immunity circuit also provides a "flag" to subsequent circuitry to disregard signals when too many filters produce simultaneous outputs.

The output of the noise immunity circuit 45 then is supplied to a detection circuit 46 where each selected signal is compared to the previous one to determine whether the frequency has changed, and if it has changed whether it is moving up or down from the previous selected sample. The detection circuit 46 operates to provide an output any time a preestablished number of successive changes of frequency in the same direction are detected. If this occurs, an output is obtained from the detection circuit 46, and this output is supplied to an alarm 50, located within the vehicle, to alert the driver of the automobile that an emergency vehicle with a siren sounding is in the immediate vicinity of the automobile. This alarm may be of any suitable type including flashing lights, an audible "beep", or a combination of the two or any other suitable indication designed to clearly attract the attention of the driver of the automobile in which the system is installed.

Figure 2:
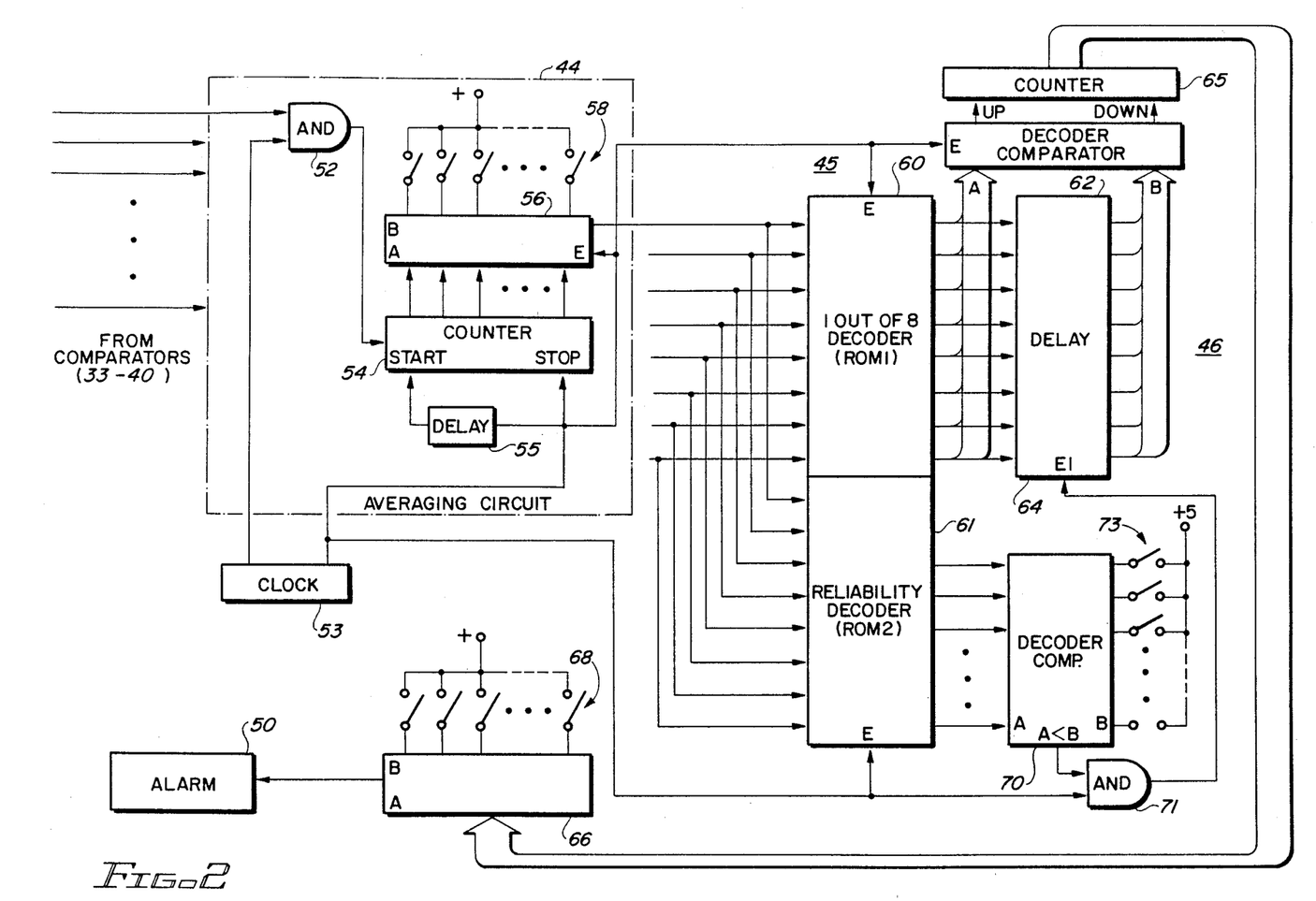
FIG. 2 is a more detailed block diagram of a portion of the embodiment shown in FIG. 1.

Reference now should be made to FIG. 2 which shows in greater detail the circuitry of the averaging circuit 44, noise immunity circuit 45, and detection circuit 46. The averaging circuit 44 actually constitutes eight identical subcircuits, each of which is supplied with a different one of the outputs of the comparators 33 through 40. Only one of these subcircuits 44 is illustrated in FIG. 2 to avoid unnecessary cluttering of the drawing, since all of these circuits are identical in structure and function.

Each of the subcircuits 44 includes an AND gate 52, one input to which is the output of the corresponding comparator 33 through 40, and the other input to which is obtained from a clock 53, common to all eight of the averaging circuits 44. The clock 53 supplies a clock pulse to the eight AND gates 52 once every millisecond to sample the outputs of all of the comparators 33 through 40 in parallel. If a positive or digital "1" output is present at the output of the comparator, a pulse is obtained from the output of the associated AND gate 52 and is supplied to the input of a counter 54.

Each sampling interval lasts for 16 milliseconds (for "yelp" or 250 milliseconds for "wail"), as controlled by another output from the clock circuit 53 applied to the stop or reset input of the counter 54. This same pulse is also supplied through a delay 55 to the start input of the counter 54 to reestablish the 16 millisecond "window" for sampling each of the comparators. As mentioned previously, all of the operating clock pulses from the clock 53 are supplied in parallel to all of the eight averaging circuits for the outputs of each of the comparators 33 through 40.

Unfortunately, the digital outputs of the comparators 33 through 40 are not absolutely steady because of noise and fluctuations in the loudness and frequency of the siren signal to be detected. Consequently, a signal present at one of the times of a sampling pulse from the clock 53 may not be present at the next sampling pulse, even though the siren is operating at that frequency during the particular sampling interval. At a minimum, however, (for a "yelp" signal which is of the shortest duration), a siren signal is present or should be present at the output of a given filter 13–20 for 16 milliseconds.

Consequently, when sixteen samples are taken through the AND gate 52 during this 16 millisecond time interval or "window", the system is operated to determine an "average presence" presence of the signal at the output of the particular one of the comparators 33 through 40 with which each averaging circuit 44 of FIG. 2 is associated.

If a signal is detected during the sampling interval by the appearance of an output pulse on the AND gate 52 for X% of the time or more, the signal is assumed to be present. If the signal is not present for X% of the time, the signal is assumed to be absent. Obviously, the smaller X is, the more sensitive is the system; but also the more sensitive is the system to noise. The larger X becomes, the stronger the siren sound must be in order for it to be detected; but also the system is less sensitive to noise. Practical experiments with an actual working system have illustrated that X=80% is the good trade-off.

The establishment of the value of X is accomplished by supplying the count stored in the counter to the "A" inputs of a comparator 56 which is supplied with a threshold count on its "B" input through the setting of switches in a switch bank 58 coupled to the "B" inputs. Once a practical threshold for "X" has been determined, the comparison count coupled to the "B" inputs of the comparator 56 may be "hard-wired" to the comparator 56 without the provision of the individual switches in the switch bank 58. Individual switches, however, are illustrated in FIG. 2 to show that the value of "X" can be changed in accordance with the particular operating environment in which the system is to be used. In any event, when the number of samples counted by the counter 54 exceeds the preset count established by the switches 58, an output is obtained from the comparator 56 at the end of the 16 millisecond sampling interval by means of the same pulse which is applied to the stop input of the counter 54. This pulse is applied to the enable "E" input of the comparator 56 to provide an output from the comparator 56 corresponding to a digital "1" if the count in the counter 54 indicates the presence of a signal comparator X% of the time during the sampling interval. If the count in the counter 54 is less than the count representative of the established value of X%, the output of the comparator 56 at the time of the enable pulse is a digital "0". This is done for all eight of the averaging circuits 44, and these eight outputs from the eight comparators 56 are applied in parallel to a 1 out of 8 decoder 60 and to a reliability decoder 61.

In a theoretically ideal situation, only one output should be obtained for any one of these 16 millisecond sampling intervals from a single one of the eight averaging circuits 44. In reality, however, due to noise, frequency overlap, and the like, frequently more than one of the comparators 56 provide a digital "1" output at the end of the sampling interval. This indicates the presence of signals in the narrow pass band of the corresponding filters 13 through 20 which provides the inputs to the comparators 33 through 40, as described previously. In addition, noise signals frequently are present in the frequency band of the siren signal; and these noise signals may last for more than the 16 millisecond sampling interval. Thus, it is possible for an output to be obtained from one or more of the comparators 33 through 40 as a result of noise, whether or not a siren signal is present at the same time. Consequently, the 1-out-of-8 decoder 60 is employed to select the "most logical" one of the eight possible outputs from the averaging circuits 44. Obviously, if only a single averaging circuit output is present, the 1-out-of-8 decoder 60 selects this single output of the averaging circuits 44 as the correct one and this is reflected by the appearance of a digital "1" signal on the corresponding one of the eight outputs of the decoder 60.

This ideal situation, where only one output appears at the end of every 16 millisecond sampling "window", first should be considered. For example, assume that after the first 16 millisecond "window" the "averaged" 8 digital signals produce the following representation on the 8 corresponding outputs:

00100000

This indicates that there is a signal presence at the desired frequency of the third filter output (the filter 15) or the equivalent of the presence of a signal in the frequency band of 850 to 975 Hz for at least X% of the time during that 16 millisecond "window". An output corresponding to this is provided on the third output of the decoder 60 which is supplied to a corresponding input of a decoder comparator 62 and to the corresponding input of a one bit delay shift register 64. All of the outputs of the decoder 60 are supplied in parallel to corresponding inputs of the decoder comparator 62 and to corresponding inputs of the one bit shift delay register 64.

Now assume that the next sampling interval provides the following inputs to the decoder 60 from the averaging circuits 44:

00001000

This means that a signal is present in the fifth band (corresponding to filter 17) or 1,100 to 1,225 Hz. This means that the sound frequency is going upward and also indicates that it has skipped the next adjacent band which would have been indicated by an output of the filter 16. This information is supplied from the decoder to the comparator 62 and to the input of the delay circuit 64. Assuming, for the moment, that these outputs are the result of a valid siren signals, the delay circuit 64 is provided with a shift pulse at the end of the sampling interval (in a manner described subsequently) to shift the signal from the first sampling interval to the output of the delay circuit 64 at the time the signal from the second sampling interval is applied to the input of the circuit 64. The output of the delay circuit 64 is connected to the "B" inputs of the decoder comparator 62 which is supplied with a "enable" or sampling pulse also from the clock 53 at the end of the sixteen millisecond interval. The decoder comparator 62 has two outputs which are supplied to a resettable counter 65, namely an "up" output and a "down" output. An output pulse is obtained on one or the other of these outputs from the decoder comparator 62 whenever the new or latest output from the decoder 60 is different from the previous or delayed output. If the "new" output indicates the presence of a signal in a higher band, the counter 65 is driven from the "up" output of the decoder comparator 62. On the other hand, if the second or subsequent 16 millisecond sampling interval resulted in a number such as:

10000000 the direction of the counter 65 would have been driven from the "down" output of the comparator 62.

The counter 65 is reset to an initial count each time a change in direction of the count is indicated from the output of the decoder comparator 62. Consequently, if the counter 65 has been counting pulses in the "up" direction and the next pulse from the decoder comparator 62 is a "down" pulse, the counter 65 is reset. Similarly, if the counter 65 has been counting pulses in the "down" direction and the next pulse from the decoder comparator 62 is an "up" pulse, the counter 65 is reset. The output of the counter 65 is applied to the "A" input of a comparator 66, the "B" inputs of which are supplied with a preset number through a switch bank 68 to establish a threshold for triggering the alarm 50.

The threshold comparator 66 operates in conjunction with the counter 65 to cause an output signal to be supplied to the alarm 50 within the automobile whenever the counter 65 counts changes in frequency some predetermined number of successive time in the same direction. If this number exceeds the threshold count set by the settings of the switches 68, an output signal is applied to the alarm 50 to activate the alarm to indicate that an emergency siren has been detected. Practical considerations in an operating system used in actual traffic conditions have indicated that the count threshold may be as low as "five". This means that three frequency movements in the same direction provides sufficient sensitivity (coupled with X=80%, as described previously) to provide a valid indication of the presence of a siren. Random noise in experiments which have been conducted with this working system never exhibited three consecutive frequency shifts in the same direction.

By way of an example, assume that the following are results from "averaging" with 60% presence criterion at sixteen millisecond sampling intervals or "windows":

01000000

00010000

00001000

00000100

00000010

00000001—Siren Detected

00100000

Note that the pattern indicated above skipped a frequency band. A frequency shift could be missed due to noise or due to siren interference of the type described previously. Even so, it has been found that sufficient information is present, even though there is a skip (in the same direction); so that a valid detection of the siren has occurred. Noise has not been found to generate a pattern of this consistency, but only spurious patterns with skipping back and forth (counting "up" and "down"), so that the detection mechanism does not trigger the alarm 50. It is important to note, however, the ability of the system to detect an alarm even though there may be a skip in one or more of the frequencies as detected by the filters and comparators providing the inputs to the averaging circuit 44. This is in contrast with those prior art systems which sequentially enable the circuit corresponding to one frequency band based on the presence of a signal in the output of the circuit corresponding to the next adjacent frequency band. A skipping of a frequency in such a prior art system results in a resetting of a disabling of the system and a potential failure to detect a valid siren signal.

The foregoing description has been directed to an "ideal" situation where only one output at a time is obtained from the eight averaging circuits 44 associated with the eight comparators 33 through 40. In actual practice, multiple outputs frequently are obtained from the comparators 33 through 40 for X% of the time in a single sampling interval; so that more than one of the outputs from the averaging circuits are a digital "1" during that interval. A valid siren signal also can produce this type of result due to frequency overlap and/or reflection coupled with Doppler offsets. Consequently, it is necessary to select the "most logical" one of these multiple outputs for processing through the decoder comparator 62 and delay circuit 64 during each sampling time interval. This is accomplished by means of the 1-out-of-8 decoder 60 which is programmed Real Only Memory (ROM) set to select the center one of multiple outputs from the averaging circuits 44 when there are an "odd" number of outputs. For example, if the outputs from the averaging circuits 44 produce the following inputs to the decoder 60:

00111000 then the output from the 1 out of 8 decoder will be:

00010000.

In the event that the outputs from the averaging circuits 44 comprise an even number of "1's", the decoder 60 essentially drops off the lower or bottom one (representative of the higher frequency) and selects the center output of the remaining odd number. For example, if the outputs from the averaging circuit are:

01111000 then the decoder 60 produces the following pattern on its output:
00100000

Also, in the event that there is a skipping of outputs, the same rules apply. For example, if the outputs from the averaging circuits 44 are:

00110100 then the output from the decode 60 simply selects the center one of the odd outputs to produce on its output the following pattern:

00010000

Some situations may arise when a large number of odd or even outputs occur with a gap between, such as:

11100111 in such an event, the same rules which have been discussed continue to apply. The right-hand "1" (corresponding to the output of the filter 20) is dropped, and an output corresponding to the center of the remaining signals is provided to result in:

00010000

Similar examples can be given for all of the possible combinations which may occur, but the foregoing examples are considered sufficient to indicate the manner in which the 1-out-of-8-decoder 60 is configured to produce a single output at the end of each sampling interval. This single output is then supplied to the inputs of the decoder comparator 62 and delay circuit 64.

Since, as explained above, it is possible for more than one output to be obtained simultaneously from the averaging circuits 44, it has been found that the operation of the decoder comparator 62 to drive the counter 65 should be inhibited or prevented for combinations of outputs from the averaging circuits 44 in excess of an amount which is likely to result from a valid siren signal. Consequently, all of the eight outputs from the averaging circuit 44 are applied in parallel to a reliability decoder 61 in the form of an additional ROM addressed by the eight inputs to it. The reliability decoder 61 is encoded to provide a binary encoded number on eight outputs to the "A" inputs of a decoder comparator 70. The number which is applied to the decoder comparator 70 comprises a decoded input (on a weighted basis) of the composite of the eight inputs supplied to the decoder 61.

An empirical determination is made of those combinations of inputs which are unlikely to result from a valid siren signal and different combinations of inputs provide a different eight bit number. This number is low for input combinations having a high probability that they are caused by a siren signal and is high for input combinations which have a high probability of being caused by noise signals. For example, if the theoretically ideal situation existed, as described previously, when only one output is obtained from the averaging circuits 44 during a single sixteen millisecond sampling interval, the reliability decoder 61 produces on its output an eight bit digital number which is as low as possible, namely "0":

00000000

Different combinations of outputs from the sampling circuits 44, such as widely spaced multiple "1" outputs or a large number of "1's" are decoded by the reliability decoder to provide higher digital numbers.

Consequently, there is an ascending numerical representation of the various combinations of outputs which may be obtained from the averaging circuits 44 as decoded by the decoder 61 and applied to the "A" input of the decoder comparator 70. If this decoded number is above a certain threshold, the decoder comparator 62 should not be operated to provide any input to the counter 65, since there is a high probability that the signals which are detected are not the result of a siren. This threshold is established by the setting of multiple switches 73 which are connected to the "B" input of the decoder comparator. Initial experimentation empirically may be used to determine the threshold or "cutoff" number (which corresponds to the combination of outputs from the averaging circuits 44) which is to be used to prevent operation of the counter 65 by the decoder comparator 62. If the number supplied to the inputs "A" of the comparator 70 is less than the number supplied to the inputs "B", the AND gate 71 is enabled. This is indicative of the probability that the received signals are the result of a siren. On the other hand, if the number applied to the input "A" of the comparator 70 from decoder 61 is greater than the number coupled to the inputs "B", the AND gate 71 is not enabled. The other input to the AND gate 71 is obtained from the clock 53 at the end of each sixteen millisecond sampling interval. This is the shift pulse which is applied from the AND gate 71 to the one bit shift register delay circuit 64. If this shift pulse is not obtained, both the "A" and "B" inputs to the decoder comparator 62 are identical. Consequently, when the enabling pulse from the clock 53 is supplied to the decoder comparator 62 at the end of the sampling time interval no output is obtained from the circuit 62 and the counter 65 is not operated. Conversely, if the number supplied from the reliability decoder 61 to the decoder comparator 70 is less than the number applied from the threshold switches 73, the AND gate is enabled and the circuit operates in the manner described previously to provide corresponding signals to the "up" and "down" inputs of the counter 65 to operate it. This is an additional level of noise immunity which is provided for the system.

Figure 3:
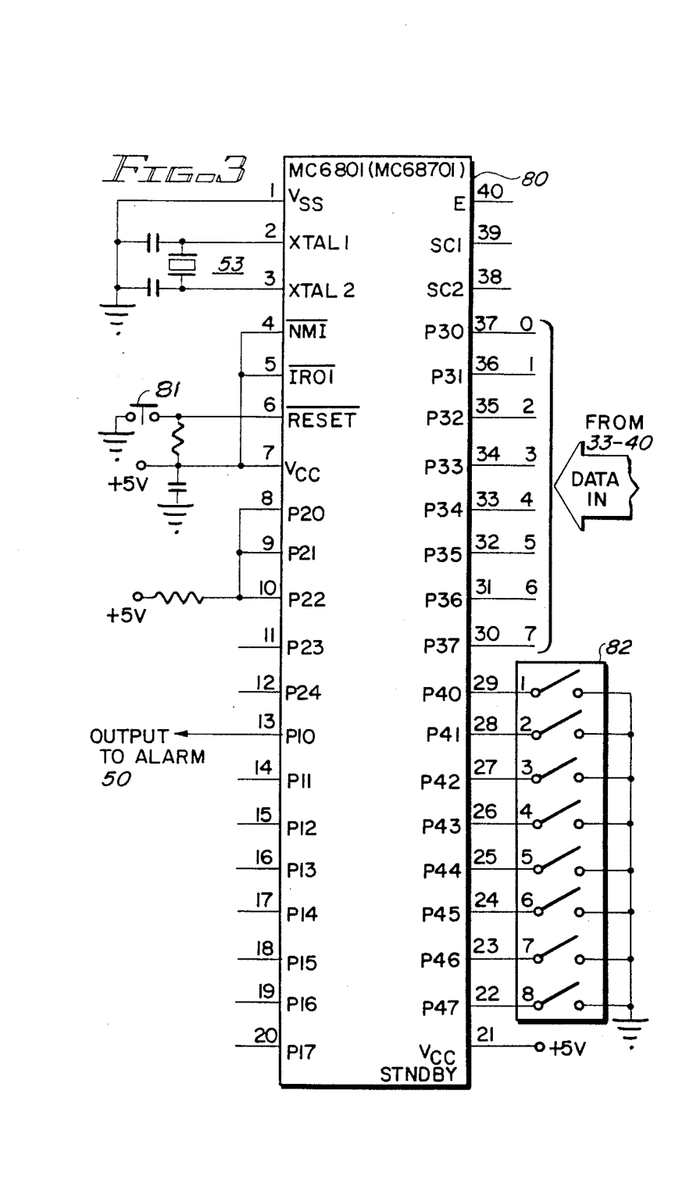
FIG. 3 is a diagram of the circuit interconnections of a microprocessor used in another embodiment of the invention.

The portion of the system which is illustrated in FIG. 2 for operating the alarm 50 also may be provided by a microprocessor instead of the individual circuit components of FIG. 2. In an actual working system, a Motorola ™ microprocessor MC6801 or MC68701 has been programmed to perform the functions of the averaging circuit 44, noise immunity circuit 45, and detection circuit 46, of FIGS. 1 and 2. The configuration of this microprocessor is illustrated in FIG. 3 which shows such a microprocessor 80 with the various interconnections to the different pins which are needed to interface the microprocessor 80 with the alarm 50 and the outputs from the comparator circuits 33 through 40 of FIG. 1. Within the elongated rectangular block representing the microprocessor 80 are the designations which are given to the forty "connector pins". On the outside of the block 80, the twenty pins on each side are sequentially numbered in accordance with the manner in which they connect to and interface with the standard MC6801 or MC68701 microprocessors.

As is readily apparent from an examination of the upper left-hand portion of FIG. 3, pin No. 1 is connected to ground. Pins 2 and 3 are connected across an external crystal which establishes the frequency of the clock 53 for operating the timing of the internal clock of the microprocessor. The particular microprocessor 80 uses an internal clock of 1 MHz, the frequency of which is divided down to provide the one millisecond and sixteen millisecond pulses described above in conjunction with FIG. 2. Pins 4 and 5 are not used, and consequently are kept at a "high" (plus 5 volts) level. Pin 6 is used to reset the system and is operated by a manual pushbutton 81 which applies ground to this pin for resetting the system after the alarm 50 has been activated. Although a manual reset button 81 is illustrated in FIG. 3, the reset also could be effected automatically after a preestablished time interval controlled by the clock of the microprocessor 80. Pin 7 comprises the +5 volts power supply input for the microprocessor. In an MC6801 microprocessor, pins 8 through 20 are input/output ports. Only one of these, pin 13, is used in the present system to provide the output signal to the alarm 50 as indicated in FIG. 3. For the present system, pins 8 through 10 are kept at a high (+5 volt) level.

Pin 21 comprises a "standby" power input and it is not used in the present system, so it is kept at a high (+5 volt) level. Pins 22 through 29 are additional input ports which are used to input several variables. These pins are connected in a prototype version through a bank of settable switches 82 to establish or program various threshold operations of the microprocessor. Pins 30 through 37 are the data input pins connected to the outputs of the comparators 33 through 40. These are the same outputs which have been discussed in conjunction with FIG. 2 and constitute the inputs to the averaging circuits. These data input pins are sampled internally of the microprocessor every millisecond in the same manner described above in conjunction with the embodiment of FIGS. 1 and 2. Pins 38 through 40 are not used for this system.

Figure 4:
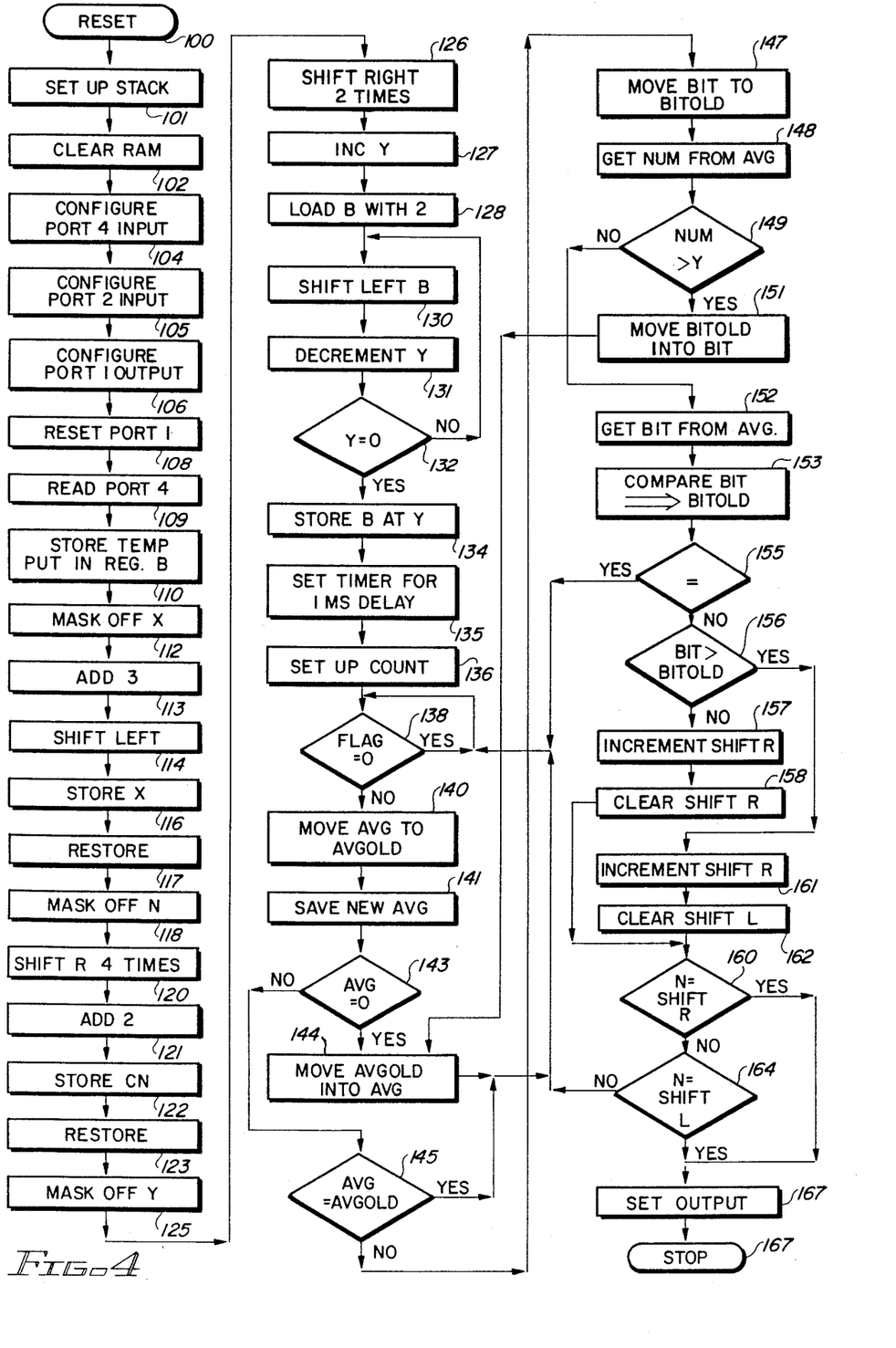
FIG. 4 is a flow chart of the operation of a preferred embodiment of the invention using the microprocessor of FIG. 3.

Reference now should be made to FIG. 4, which is a flow chart for initializing the programs in the microprocessor 80 and illustrating the operation of those programs to perform the same function as the system of FIGS. 1 and 2, described previously. Before entering into a detailed discussion of FIG. 4 a description of the overall function of operation of the microprocessor 80 for the processing of the data available at the output of the comparators 33 through 40 is considered helpful. As with the system of FIG. 2, 8 parallel inputs are supplied to the microprocessor and these inputs are representative of the presence or absence of a signal in any one or more of the 8 narrow frequency bands covered by the filters 13 through 20. The microprocessor 80 samples each of these eight input bits once every millisecond. Every millisecond, and interrupt routine is executed. This interrupt routine samples the eight-bit input; and keeps a running count of (i) the sample number in the window, and (ii) the number of times of "1" occurs in each bit, when the sample number reaches sixteen, the average is computed; and a flag is set signally to the main program that the average is ready. The interrupt routine computes an average value of the samples to assume the presence of a signal in the sampled frequency band if X% of the sixteen samples indicate the presence of a signal. If so, the average value is assumed to be a digital "1" (signal present); and if a signal was sampled to be present less than X% of the time, the average value is considered to be "0" (no signal). X is selected initially in the setting up or programming of the microprocessor 80 to be any one of 6, 8, 10, or 12 out of the total 16 samples in any sampling time interval or "window" preceding the interrupt routine. This results in 1 byte per each 16 milliseconds which is identified as "AVG", and which is passed to the main program. The value of the previous sixteen millisecond byte, "AVGOLD" is saved. All older AVG values can be discarded since only these two are of significance in the operation of the program. After both AVG and AVGOLD are updated, a flag is set signaling to the main program in the microprocessor 80 that new values of these bytes are available.

The main function of the microprocessor 80 is to continuously check the value of the flag of the input routine. If that flag is set, the new value of AVG is compared to the old value AVGOLD. If both are equal, no action is taken (that is the flag is cleared and the program resumes). If AVG=0 (no byte set) AVG is replaced by the previous value AVGOLD and no further action is taken (flag cleared program resumes). Thus, "0" averages are ignored by the program.

If AVG is different from AVGOLD and also is different from zero (0), the flag is cleared and AVG is used to retrieve 2 bytes from tables stored in the memory of the microprocessor 80. The first byte which may be called "BIT" consists of only 1 bit set. BIT is a weighted hexadecimal number derived from the representation of all 8 of the AVG inputs considered as a binary number and is a direct conversion. For example, if AVG is 00001010, BIT is 00000100. Similarly, if AVG is 11111111, then BIT is 00010000 as defined in the table which is established in the memory of the microprocessor 80. Similar conversions exist for each of the other possible combinations of AVG. The second byte, called "NUM", may be any number between 0 and 44 (decimal). Before "BIT" is loaded with its new value, however, its value from the previous sampling interval is saved in "BITOLD". Consequently, at any given time the following numbers are available:

AVG

AVGOLD

BIT

BITOLD

NUM

NUM from the previous sampling interval does not need to be saved and is discarded.

The main program then checks to determine whether NUM exceeds a certain threshold "Y". "Y" again is entered by the user, initially through externally programmable switches and may either be 4, 8, 16, or 32. If NUM is larger than Y, this sample again is discarded, that is, AVG is replaced by its previous value AVGOLD; and the value for BIT remains what it was (in other words BIT is not updated, the flag is cleared, and the program resumes). If NUM does not exceed Y, the program proceeds.

The objective of the main program is to count the number of times where the one byte in BIT which is "1" shifts in the same direction. This corresponds to the operation of the reversible counter 65 and the comparator 66 in the embodiment disclosed in FIG. 2. When "N" such shifts are counted (N is again a number entered by the user by way of externally programmable switches in the switch bank 82 and can be 2, 3, 4, or 5), an output is provided. As stated previously, N=3 has been found to be a satisfactory number of successive shifts in the same direction to establish the validity of the presence of a siren signal in an actual working embodiment. Consequently, if N is set to be equal to 3, and 3 such shifts occur for BIT, an output is obtained on the output pin 13 to activate the alarm 50. This one BIT remains set in the configuration of the microprocessor 80 shown in FIG. 3 until the reset button 81 is operated by the driver of the automobile in which the system is installed. As explained previously, this also may be effected automatically after a preestablished time interval from internal programming of the microprocessor 80 if desired.

NUM is a weighted number corresponding to the number of binary "1" outputs appearing simultaneously on the averaged value of the samples from the input to the microprocessor 80 obtained from the outputs of the comparators 33 through 40. It is encoded in binary form within the microprocessor 80 for processing and is a low number for a minimum number of binary "1" averaged inputs on the data input terminals and is a maximum (decimal 44) when all 8 inputs have an average sampled value of binary "1" during the sampling interval. This number (NUM) is used within the microprocessor 80 in the manner in which the reliability decoder 61 and decoder comparator 70 are used in the embodiment of FIG. 2 to provide an enhanced noise rejection capability for the system. Functionally, the end result is to cause the microprocessor 80 to incorporate all of the functional operations which have been described previously in conjunction with FIG. 2.

In initializing the program of the microprocessor 80, the switch bank 8 may be used to establish the value of "X", "Y", and "N". Once the optimum values have been determined, however, this initialization procedure may be eliminated and permanently established in the operating program for the microprocessor. The switch bank 82 then could be eliminated.

To the initialization of the program of the microprocessor 80 (FIG. 3) the microprocessor first is reset 100. The stack 101 is set-up and the RAM 102 is cleared. Then as indicated in FIG. 4 at 104 through 110 the ports are configured, stored and read.

The next step then is to establish the value of X% for determining the threshold for digital representation ("1" or "0") of the outputs of the comparators 33 through 40 constituting the eight parallel data input terminals to the microprocessor 80. This is done by masking off "X" 112 through the setting of the switches in the switch bank 82 connected to pins 28 and 29. The four different "on" and "off" combinations of these switches establish a weighted value number of "6, 8, 10, or 12" out of the 16 samples to constitute the desired percentage needed to establish whether AVG is a binary or digital "1" or "0". Once this is done, 3 is added to the selected number at 113, it is shifted left 114, and the value "less than X" 116, or the threshold, is stored and then restored at 117. The next step is to mask off or establish "N" 118, which is the number of consecutive shifts in the same direction necessary to operate the alarm 50. This number is entered by closing any one of the switches 82 on pins 22 through 29 providing the reversely weighted values 1 through 8 indicated within the box representative of the switch 82 in FIG. 3. "N" is then shifted right four times, 120, stored and restored (121 through 123).

Next, the value of "Y" is masked off 125. "Y" is the threshold value corresponding to the threshold set by the switches 73 in the reliability decoder comparator 70 of the embodiment of FIG. 2. This is a weighted number and is set by using the switches of the switch bank 82 at pins 26 and 27. This is the value against which "NUM" from the decimal table is compared in the operation of the system.

The foregoing is based on the 16 millisecond sampling interval for "yelp". For "wail" sampling over a 250 millisecond interval some changes as a result of the longer interval would be made.

As stated previously in conjunction with the description of the operation of the system shown in FIG. 2, if the threshold "Y" is exceeded (too much distortion), the sample of the data inputs is considered unreliable and is discarded. On the other hand if this preestablished threshold is not exceeded, the sample is assumed to be representative and the program is run to determine the direction in which the selected or decoded "on" byte has shifted.

Steps 125 through 134 are directed to the sequence followed in initially fetching the correct value of "Y" and placing it in the memory of the microprocessor 80. These steps comprise sequential shifting in "A" and "B" accumulators, as indicated, with alternating shifting left "B" 130 followed by decrement "Y" at 131 until "Y" equals "0" at 132. At this point the correct value of "Y" is stored in memory 134.

After this, the timer is set at 135 for the one millisecond delay or one millisecond interval used to sample the eight data input lines on pins 30 to 37 of the microprocessor 80. The count which constitutes the time interval or sampling interval is set up at 136; and at the end of this count, the program flag 138 is sampled in the operation of the system.

As is readily apparent from an examination of FIG. 4, the value of the flag 138 of the input routine is continuously checked throughout the operation of the program. If the flag 138 is set (that is, not equal to 0) the new value of AVG is compared to the old value AVGOLD. If both are equal 145 no further action is taken and the flag 138 is cleared and the program resumes. If AVG equals "0" 143, (that is, no bytes are set), AVG is replaced by the previous value AVGOLD 144 and no further action is taken and the flag 138 is cleared.

If AVG is different from AVGOLD and also different from "0" the flag is cleared and AVG is saved. This is used to retrieve two bytes, namely "BIT" and "NUM", from the tables stored in the memory of the microprocessor 80. Before "BIT" is loaded with its new value, the value from the previous sixteen millisecond sample interval is saved in BITOLD 147. NUM is determined from AVG 148 and a check at 149 is determined to see if NUM exceeds the threshold "Y". If NUM is larger than "Y", the sample is discarded and BITOLD is moved into BIT 151 and AVGOLD is moved into AVG 144, as indicated in FIG. 4. In other words, for this condition, BIT is not updated, the flag 138 is cleared and the program resumes.

If NUM does not exceed "Y" at 149, the program proceeds. The new value of BIT is obtained from the table in accordance with AVG 152, and the new BIT is compared with BITOLD at 153. If they are equal 155 the flag 138 is cleared and the program resumes. If they are not equal 155, a comparison is made 156 to determine whether BIT is greater than or less than BITOLD. If BIT is less than BITOLD, an increment shift to the right 161 is effected; and any previous shifts to the left are cleared 162. Similarly, if BIT is greater than BITOLD, an increment shift to the left 157 is effected and a clearing of any previous shifting to the right 158 is effected. The number of shifts right and shifts left are determined at 160 and 164 and are compared at "N".

If either the shifts right or shifts left (160 or 164) equal "N" the output 165 is set; and this is the output provided on pin 13 to activate the alarm 50. This output also operates to stop the program operation 167 until it is reset by an operation of the reset pushbutton 81 shown in FIG. 3. If after each comparison of "N" equals either shift right or shift left has been effected and neither of these operations count a consecutive number of shifts in the same direction to equal the number "N", the flag 138 is reset; and the program continues to run until the output is set at 165 as described previously.

Figure 5:
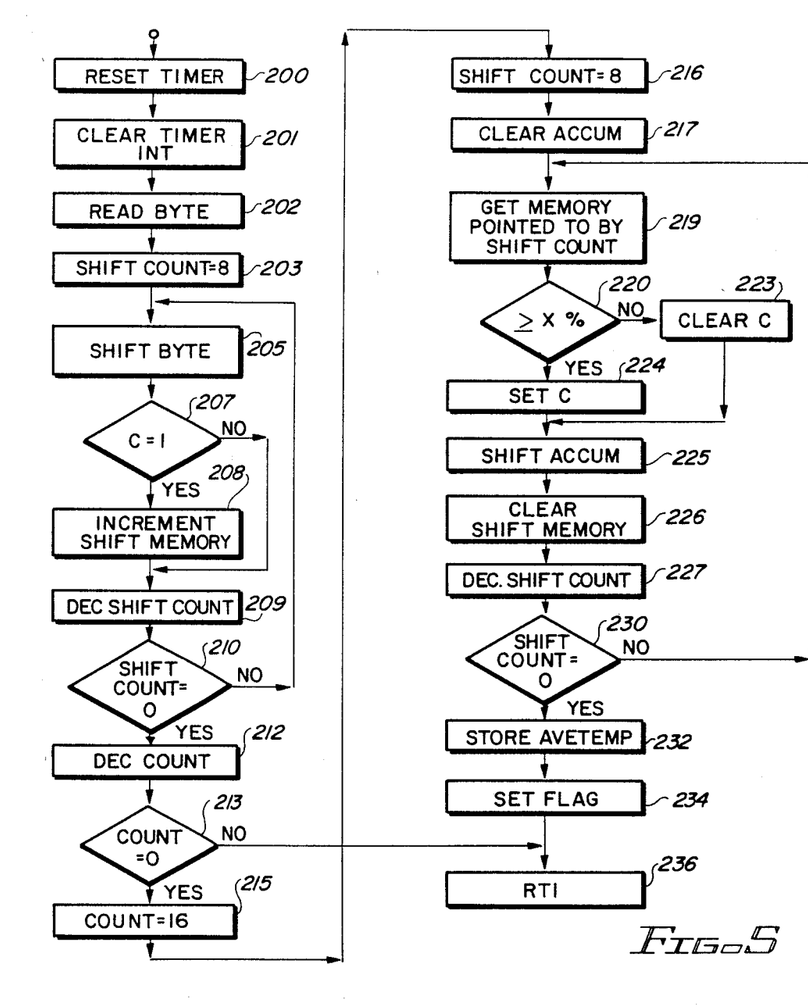
FIG. 5 is a flow chart useful in explaining the operation of the embodiment of FIGS. 3 and 4.

FIG. 5 is a flow chart of the internal timer for the microprocessor 80 to control the system operation described above in conjunction with FIG. 4. This timer causes an interrupt to be provided to the main program every millisecond. After each millisecond is counted and the interrupt is received (the jump to the interrupt program is effected) the timer is reset 200. The interrupt then is cleared 201 and the input byte is read 202. Next a shift counter is set to "8" at 203. This counter counts eight bits as the byte is shifted from left to right, that is "shift count" "points" to the bit in question. Thus, the input byte is shifted 205 and the decision is made at 207 whether the left most bit equals "1" (the byte shifted to the carry (c) at the left of the eight bits of the counter 203.

If the left most bit equals "1", the appropriate "shift memory" is incremented (pointed to be an off-set plus shift count). If the left most bit does not equal "1", the interrupt timer program continues at 208. Thus, a "1" is counted in "shift memory" if it is present.

The next step is to decrement the shift count, that is point to the next bit and associated "shift memory" location at 209. If the shift count equals zero (yes) all bits are looked at and continue 210. If the shift count does not equal zero, the sequence is repeated at 205.

Continuation of the program at "count" 212 counts the number of one millisecond samples which have been processed. After each complete sample is looked at, "count" decremented 212.

If count equals zero 213 (window completed) then it is reset to "16" at 215. If the "count" at 213 does not equal zero, the system is returned to the main program (RT1) at 236 without setting the "flag".

Assume, however, that the count equals "16" at 215. The "count shift count" then is reset to eight at 216 (as previously at 203) to point again to the left most bit. At 217 the accumulator is cleared and "shift memory" is pointed to by "shift count" (with some off-set) at 219. If this value is larger than or equal to X, carry (c) is set in 224. If not, carry (c) is cleared at 223.

The accumulator at 225 then is shifted back to place the bit previously in carry (c) if the left most position of the "shift memory". As a consequence the "shift memory" location is cleared at 226 for the next window.

Next the "shift count" is decremented at 227 to point to the not zero, the sequence is repeated at 219. If the "shift count" is zero at 230, the window is completed and the final averaged word is stored in AVETEMP 232. A "flag" then is set at 234 to signal to the main program that a window is completed and the system then returns to the main program at 236.

Figure 6:
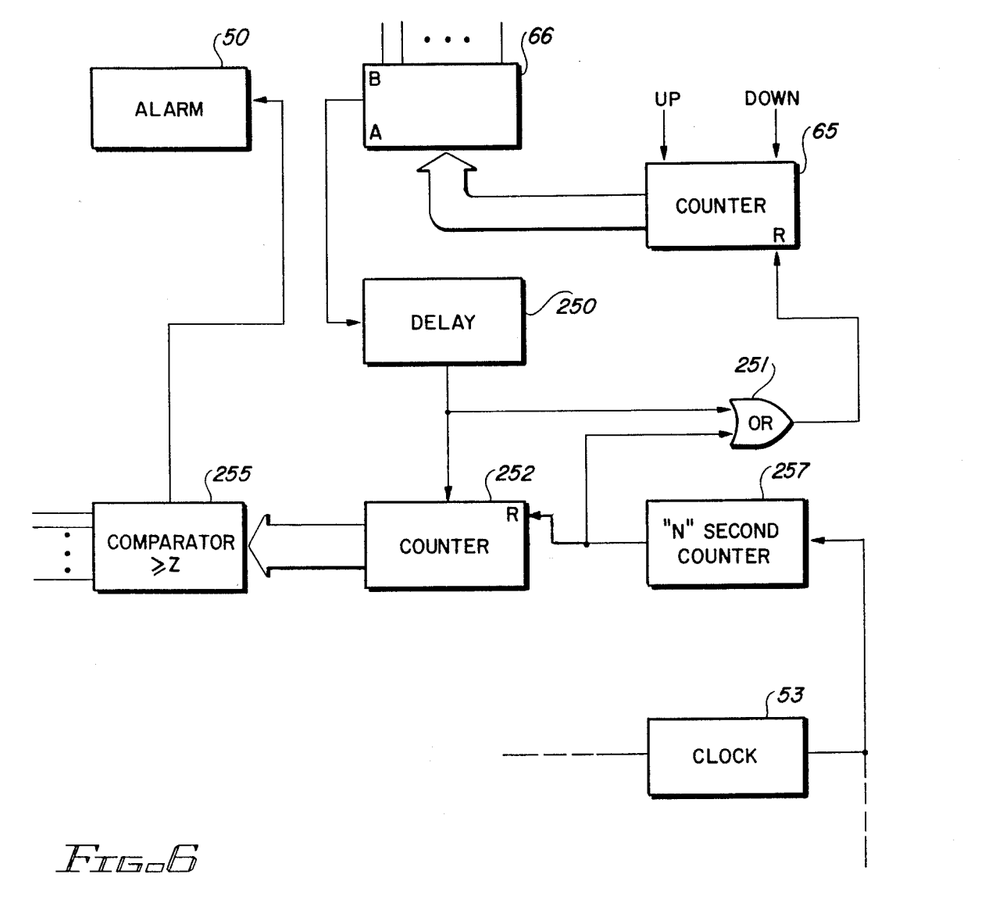
FIG. 6 is a variation of the embodiment of FIG. 2.

Reference now should be made to FIG. 6 which is a variation of the embodiment of FIG. 2. FIG. 6 should be considered in conjunction with FIG. 2, since the operation of the circuit of FIG. 2 also is employed in conjunction with the circuitry shown in FIG. 6.

The circuit of FIG. 6 permits a greater sensitivity while at the same time reducing the possibility of "false alarms" which may be possible under "worst case" conditions of the operation of the circuit of FIG. 2. The system which has been described above in conjunction with FIGS. 1 and 2 produces excellent performance with very good insensitivity to ambient traffic noise. It is apparent, however, that with the circuit of FIGS. 1 and 2, there is a definite trade off between the noise rejection capabilities of the system and sensitivity to sirens which trigger the alarm 50 for optimum performance under "worst case" conditions.

In the technique described above in conjunction with FIG. and 2, essentially one sweep of the siren is detected (up or down) for triggering the alarm 50. As explained, this is achieved by counting the number of successive shifts of frequency in the same direction (either up or down); and when a preselected number of such shifts are detected, the alarm 50 is triggered. To permit detection of valid alarm signals at greater distances, however, the sensitivity of the system to false alarms or ambient noise, is increased with the system of FIGS. 1 and 2.

To improve the system rejection of false alarms, while at the same time permitting the sensitivity for siren detection at greater distances to be improved, the circuit of FIG. 6 has been developed. The additional circuit elements which are shown in FIG. 6 interconnect with the correspondingly identified elements of FIG. 2, so that reference also should be made to FIG. 2 in conjunction with FIG. 6 for an understanding of the operation of the portion of the circuit shown in FIG. 6. Full duplication of the circuit of FIG. 2 has not been made in FIG. 6 to avoid unnecessary cluttering of the drawing.

A primary difference between the circuit of FIG. 6 and the one of FIG. 2 is that the output of the alarm trigger comparator 66 is not connected directly to the input of the alarm 50 as in the circuit of FIG. 2. Instead, whenever an output signal is obtained from the circuit 66, is is connected through a delay circuit 250 which has a delay of "T" seconds. This delay "T" may vary in accordance with the design parameters of the system. "T" is chosen just to avoid oscillation and typically is less than one millisecond, but is larger than the "settling time" of the circuit prior to the delay 250. As a result, the reset of the counter 65 is not effected until all logic levels in the system are valid. The output of the delay circuit 250 then is supplied to an ORgate 251, the output of which in turn is supplied to the reset input of the up-down counter 65 (of FIG. 2) to reset the counter 65 to its initial count. This resetting is the same as the resetting which occurs for the counter 65 when the "up" or "down" pulse direction changes.

In addition, the output of the delay circuit 250 is supplied to a counter 252 which is employed to count the number of alarm indications (from the comparator circuit 66) which occur in a given length of time. The length of time is determined by an "N" second counter 257 which produces an output every "N" seconds in response to the operation of the counter 257 by clock pulses from the clock 53 (also shown in FIG. 2).

Typically "N" is chosen as the maximum allowable time between when a siren is first detected and when an output is produced. If the maximum distance for the microphone 10 to detect a siren is "X" feet; and the minimum distance at which a siren must be detected is "Y" feet, then:

$$N=(X-Y)/V$$

where "V" is the maximum speed of any emergency vehicle. In an actual working system, this time "N" was approximately eight seconds. Every time a pulse is obtained from the counter 257, the counter 252 is reset; and, in addition, this pulse is applied through the ORgate 251 to reset the up-down counter 65. Consequently, the system continuously resets, irrespective of the conditions of the alarm triggering circuit (through the comparator 66), every "N" seconds.

Alarm pulses obtained from the output of the comparator 66, after delay by the delay circuit 250, are applied to the counter 252 which provides a multiple line output to a comparator 255 (similar to the comparator 66 of FIG. 2). The comparator 255 is set to provide an output after the number of pulses from the counter 252 are equal to or greater than "Z" pulses. The setting of the number "Z" may be effected through external switches to provide the count comparison to the left hand side of the comparator 255, as illustrated in FIG. 6. Whenever the count from the counter 252 equals or exceeds "Z" in the time period established by the "N" second counter 257, an output is obtained from the comparator 255 which then is used to trigger the alarm 50 in the same manner described previously in conjunction with FIG. 2.

As is apparent from consideration of the operation of FIG. 6, the system resets the counter 252 continuously every "N" seconds. Consequently, even if false alarms are detected by the comparator 66 during any one of the "N" second intervals, the false alarms do not trigger the final alarm 50 unless there are more than "Z" alarms during each "N" second interval (typically eight seconds). The number "Z" is set to equal the most number of false alarms that occur under heavy traffic conditions within each "N" second interval. Consequently, even if ambient traffic noise creates one or more false alarms during the "N" second interval. The alarm circuit 50 is not triggered.

Under noiseless conditions, the system is set so that a valid emergency produces more than "Z" alarms during the "N" second interval. Consequently a valid siren always triggers the alarm 50 during this interval since the siren produces more than "Z" alarms during the interval.

Under noisy conditions, noise potentially can produce "a" alarms (from the comparator 66); and if a siren is also present during noisy conditions, the siren will produce "b" alarms (outputs from the comparator 66). Generally speaking, if the noise is very strong (heavy traffic conditions), "a" will be large; and by design, the maximum value of "a" is chosen to be equal to or less than "Z". Since the siren sound of a valid siren is masked by noise most of the time, "b" may be small in heavy traffic. However the sum of "a" and "b" can still be expected to exceed "Z" and set off the final alarm 50. This is the desired condition of operation.

In light traffic, "a" will be small; but at the same time the siren is either not masked by noise, or is barely masked by noise. Thus, "b" is large. Once again, the sum of "a" and "b" will exceed "Z" and trigger the alarm 50 through the output of the comparator 255.

Finally, since "Z" is chosen to be the most number of false alarms which can occur due to noise alone (the signal "a"), the final alarm 50 is not triggered by traffic noise or ambient noise alone.

The result of the modification of the circuit of FIG. 6 is that it is possible to increase the sensitivity of the system for valid alarms, while at the same time producing improved ambient noise rejection. This significantly reduces the possibility of false alarms from the system.

The foregoing description of the preferred embodiments is to be considered illustrative only of the invention and not as limiting. Various changes and modifications may be made by those skilled in the art without departing from the true scope of the invention as defined in the appended claims.

We claim:

1. A system for detecting the presence of sound signals varying in frequency in a predetermined manner over a predetermined frequency range, said system including in combination:

a source of input signals representative of said sound signals;

frequency selective sampling means coupled with the output of said source of input signals for sampling the output thereof at a sampling rate substantially greater than the rate of variation of said input signals for producing a first sample output signal from said frequency selective sampling means when an input signal representative of a sound signal in one of a plurality of different portions of said predetermined frequency range is present on the output of said source of input signals a predetermined number of times during a sampling interval of a predetermined unit of time, and for producing a second output signal therefrom when an input signal representative of a sound signal is present on the output of said source of input sound signals less than said predetermined number of times during such predetermined unit of time;

first counter means responsive to the output of said frequency selective sampling means for counting the number of successive shifts in frequency from one of said different portions of said predetermined frequency range to another as represented by successive first sample output signals to produce an operating signal in response to a predetermined number of successive frequency shifts in the same direction;

second counter means coupled to the output of said first counter means and responsive to successive operating signals from said first counter means for producing an output signal on the output of said second counter means in response to a count of a predetermined number of said operating signals by said second counter means;

interval timing means having a timing interval of "N" seconds coupled with said first and second counter means for continuously resetting first and second counter means to an initial count every "N" seconds;

means coupled with the output of said first counter means and responsive to said operating signals for resetting said first counter means a predetermined time interval after each such operating signal is produced by said first counter means; and means coupled to the output of said second counter means for producing an indicator in response to the attainment of a predetermined count by said second counter means.

2. The combination according to claim 1 wherein said means for resetting said first counter means a predetermined time interval after each such operating signal is produced comprises delay circuit means, and said predetermined time interval is less than said "N" seconds.

3. The combination according to claim 2 wherein said frequency selective sampling means further includes means therein for causing said first sample output signals to be indicative of the direction of frequency shifts of said different portions of said predetermined frequency range for successive first sample output signals and wherein said first counter means also is reset each time a change in direction of frequency shifts occurs.

4. The combination according to claim 3 wherein said source of output signals includes microphone circuit means responsive to said sound signals.

5. The combination according to claim 1 further including delay circuit means wherein the input of said second counter means is coupled with the output of said first counter means through said delay circuit means; and an OR gate, the output of which is coupled to a reset input of said first counter means, with the output of said interval timing means and the output of said delay means coupled to inputs of said OR gate.

6. The combination according to claim 5 wherein said frequency selective sampling means further includes means therein for causing said first sample ouput signals to be indicative of the direction of frequency shifts of said different portions of said predetermined frequency range for successive first sample output signals and wherein said first counter means also is reset each time a change in direction of frequency shifts occurs.

7. The combination according to claim 6 wherein said source of input signals includes microphone circuit means responsive to said sound signals.

8. The combination according to claim 1 wherein said frequency selective sampling means further includes means therein for causing said first sample output signals to be indicative of the direction of frequency shifts of said different portions of said predetermined frequency range for successive first sample output signals and wherein said first counter means also is reset each time a change in direction of frequency shifts occurs.

9. The combination according to claim 1 wherein said source of input signals includes microphone circuit means responsive to said sound signals

* * * * *